Feb. 17, 1953   J. BIRKMAIER   2,628,362
FLUSH VALVE
Filed April 28, 1948   2 SHEETS—SHEET 2
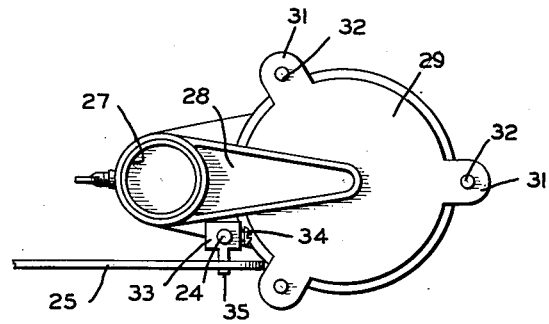
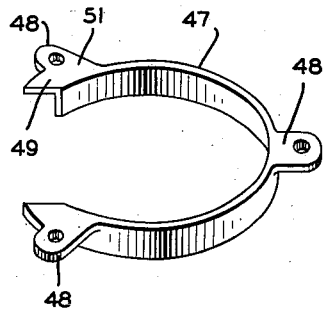
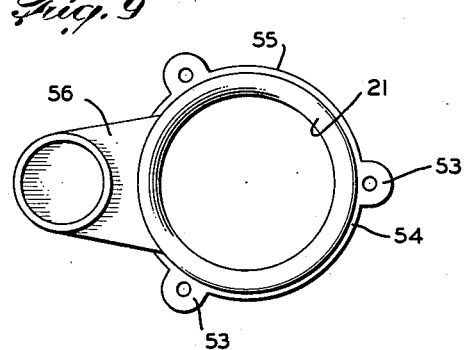
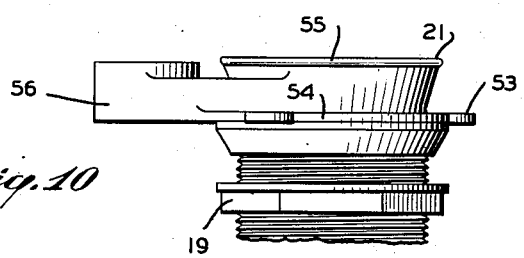
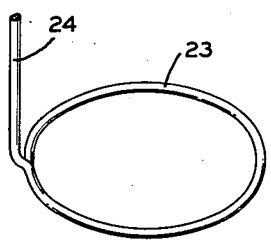
JOHN BIRKMAIER
INVENTOR.
BY Richard S. Tewko
ATTORNEY Patented Feb. 17, 1953

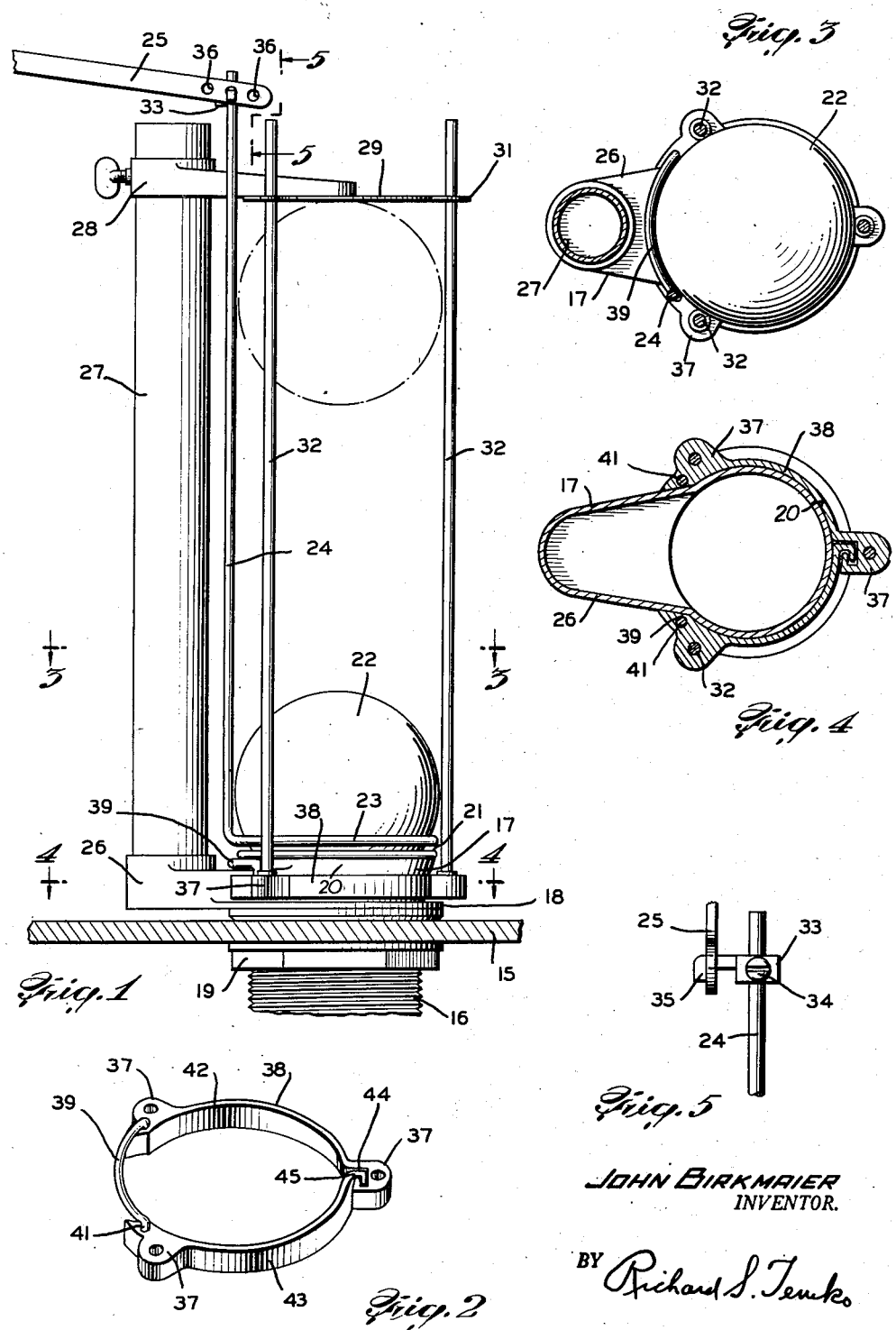

2,628,362

UNITED STATES PATENT OFFICE 2,628,362

FLUSH VALVE

John Birkmaier, Franklin Square, N. Y.

Application April 28, 1948, Serial No. 23,800

2 Claims. (Cl. 4—57)

This invention relates to flush valves or flush tanks.

It is an object of the present invention to provide a detachable ball valve cage device which can be placed over a flush valve seat and retained thereon in a detachable manner wherein a simple retaining lock is had and the supporting plate annular structure becomes rigid with the valve seat fitting and can be applied thereover without interference from the overflow pipe which extends upwardly from the valve seat fitting and wherein the cage and wires are positively retained at their lower ends to the valve seat fitting.

Other objects of the present invention are to provide a flush valve mechanism for flush tanks which is of simple construction, inexpensive to manufacture, easy to install upon the outlet ball seat fitting of the flush tanks, and efficient in operation.

For other objects and for a better understanding of the invention, reference may be had to the following detailed description taken in connection with the accompanying drawing, in which Fig. 1 is a side elevational view of a ball seat fitting with the overflow pipe connected therewith and with the flush valve mechanism attached to the ball seat and including a ball with means for lifting the same from its seat, Fig. 2 is a perspective view of the locking plate which is used for attaching the mechanism to the ball valve seat, Figs. 3 and 4 are, respectively, transverse sectional views of the flush valve mechanism taken, respectively, on lines 3—3 and 4—4 of Fig. 1, Fig. 5 is a fragmentary elevational view showing the connection of the operating handle with the upper end of the lift rod for the ball, the view being taken generally on line 5—5 of Fig. 1, Fig. 6 is a top plan view of the mechanism, Fig. 7 is a fragmentary perspective view of the bottom of the lift rod and of the ring portion thereof adapted to be fitted about the ball to lift the same, Fig. 8 is a perspective view of a modified form of supporting annular structure wherein the attachment of the same is effected by disengagement of the ball seat member and lifting the same into place from the bottom of the ball seat member, the annular structure extending about the ball seat member more than 180°, Fig. 9 is a top plan view of a ball seat member or fitting having integral lug portions for receiving the lower ends of the cage wires, Fig. 10 is a side elevational view of the ball seat member shown in Fig. 9 secured to the upper end of the outlet pipe.

Referring now to Figures 1 to 7, 15 represents the bottom of a flush tank into which there is extended an outlet pipe 16 and on the upper end of which is a ball seat member 17 having a bottom face 18 adapted to be secured against the bottom face by a nut 19 upon being elevated against the tank bottom. The member 17 has a round top seat surface 21 for receiving ball valve element 22 about which extends a loop 23 of a lift rod 24 extending upwardly for connection with a lift lever 25. The ball seat member 17 has a side projection 26 upwardly from which extends an overflow pipe 27. On this pipe 27 there is adjustably secured a bracket 28 having a plate portion 29 with lugs 31 thereon through which the upper ends of cage rods 32 are extended. The bracket 28 is adjustable to vary the extent to which the ball valve element 22 may be lifted.

The rod 24 has an adjustable bracket 33 thereon which is secured to the rod 24 by a set screw 34. This bracket 33 has an arm 35 with a downwardly bent hook and adapted to extend through any one of a series of holes 36 in the lever 25.

The lower ends of the cage rods 32 are seated in lug portions 37 of a plate 38 adapted to be locked to the periphery of the member 17 by a wire 39 having downwardly bent ends 41 adapted to fit in holes in the ends of separable members 42 and 43 forming the plate 38. The member 42 has, on one end, a lug 37 in which is fashioned a recess 44 adapted to receive a hook formation 45 of the member 43, Figs. 2 and 4. Accordingly, there has been provided an annular structure for supporting the cage rods 32 which can be extended about the ball seat member 17 without having to disassemble the member 17 from the bottom of the flush tank. When it is desired to remove the structure 38 from the member 17, the wire 39 is lifted from the parts 42 and 43 and the hook end formation 45 is dropped out of the recess 44.

Referring to Fig. 8, there is shown a modified form of the invention wherein the locking structure, as indicated by reference character 47, is formed in one piece and is adapted to be tightly fitted over the neck portion 20 of the member 17, and is preferably composed of a resilient material as for example bronze or corrosion-resisting steel. The member 47 is open throughout a small arc to extend to the opposite sides of portion 26. The member 47 has lug formations 48 integral therewith and a flange 49 extending from side lug 51 to the end faces of the member. In order to facilitate attachment of the member 47 with the member 17, the same is forced over the periphery of the neck portion 20 of the member 17 until it is in a fully seated position, the member 47 being retained in its fully seated position by its resilient action.

In Figs. 9 and 10, there is shown a still further form of the invention wherein the lugs for supporting the lower ends of the rods 32 are, as indicated at 53, made integral with the valve seat member. These lugs preferably extend from a ring formation 54 surrounding the main part of the member. This member with the integral lugs and ring is indicated generally at 55. A portion 56 extends laterally for supporting the overflow pipe 27. The member 55 can be similarly attached to the threaded outlet pipe 16 and secured by the same nut 19 upon the bottom of the tank. Both the members 17 and 55 have the threaded outlet pipe integral therewith. It is apparent, however, that the member could be formed with internal threads engageable with a threaded outlet pipe portion.

It should now be apparent that there has been provided an annular structure for supporting cage rods which can be detachably connected to the valve seat member with little effort and in one form of the invention without having to remove the member from the tank bottom in order to make the connection of the locking plate therewith.

While various changes may be made in the detail construction, it will be understood that such changes shall be within the spirit and scope of the present invention as defined by the appended claims.

I claim:

1. A flush valve construction comprising: a ball seat member having a lateral extension, an overflow drain pipe supported on the lateral extension, a cage rod supporting annular structure adapted to be releasably secured to the ball seat member; said cage rod supporting structure including separable members with lug projections thereon; cage rods extending into the lug projections, and adjustable means connected to the upper end of the cage rods and adapted to be adjusted along the overflow drain pipe; one of said members having a recess, the other having a formation adapted to be extended into the recess; said members being adapted to partially extend above the ball seat member; and a locking wire adapted to be extended between the free ends of said members and over the lateral extension of the ball seat member to retain the members on the ball seat member against lateral displacement.

2. A flush valve supporting annular structure, adapted to fit upon a valve seat member having a lateral projection member, and about the same comprising: a pair of arcuately-shaped portions and a wire member having downwardly bent terminal portions; said annular structure having an opening to permit the disposal of the same upon the valve seat member without interference from said lateral projection; said arcuately-shaped portions having first ends; each of said first ends having means for mutual hinged engagement; said arcuately-shaped portions also having second ends each having a hole therein; the downwardly bent terminal portions of said wire member being engageable in said holes, whereby said members are positively maintained about said valve seat member.

JOHN BIRKMAIER.

REFERENCES CITED

The following references are of record in the file of this patent:

UNITED STATES PATENTS

| Number | Name | Date |
| --- | --- | --- |
| 1,054,940 | Rea | Mar. 4, 1913 |
| 1,237,109 | Shoppe | Aug. 14, 1917 |
| 1,515,414 | Rockhill | Nov. 11, 1924 |
| 1,655,894 | Davenport | Jan. 10, 1928 |
| 1,799,770 | Wegner | Apr. 7, 1931 |
| 1,926,754 | Roberts | Sept. 12, 1933 |
| 2,189,345 | Hillegas | Feb. 6, 1940 |
| 2,460,114 | Zern | Jan. 25, 1949 |